United States Patent [19]

Troller

[11] 4,397,745

[45] Aug. 9, 1983

[54] FILTER CARTRIDGE FOR SUMP CLEANER

[75] Inventor: Robert J. Troller, Madison, Wis.

[73] Assignee: CECOR Incorporated, Verona, Wis.

[21] Appl. No.: 365,250

[22] Filed: Apr. 5, 1982

[51] Int. Cl.³ .............................................. B01D 29/14
[52] U.S. Cl. ................................... 210/237; 210/406;
210/474; 210/484
[58] Field of Search ............... 210/237, 238, 241, 406,
210/407, 416.1, 474, 484, 497.01

[56] References Cited

U.S. PATENT DOCUMENTS

| | | | |
|---|---|---|---|
| 2,017,277 | 10/1935 | Gatewood | 210/454 |
| 2,172,031 | 9/1939 | Norman | 210/472 |
| 2,363,009 | 11/1944 | Lewis | 210/454 |
| 2,366,903 | 1/1945 | Harms et al. | 210/108 |
| 2,902,161 | 9/1959 | Hunbert, Jr. et al. | 210/241 |
| 3,012,676 | 12/1961 | Emglesburg | 210/241 |
| 3,355,026 | 11/1967 | Schut | 210/448 |
| 3,648,842 | 3/1972 | Zievers | 210/237 |
| 4,081,379 | 3/1978 | Smith | 210/444 |

FOREIGN PATENT DOCUMENTS 554198   6/1943   United Kingdom .

Primary Examiner—Ivars C. Cintins
Attorney, Agent, or Firm—Isaksen, Lathrop, Esch, Hart & Clark

[57] ABSTRACT

A sump cleaner (10) is disclosed including a filter cartridge (26) adapted for easy removal and dumping. A lifting fitting (40) is provided on the filter cartridge (26) so that it can easily be lifted from the sump cleaner (10) to be emptied through its bottom door (56) and the filter shell (46) of the filter cartridge (26) is provided with a tapered geometry to prevent jamming or bridging of the filtered material during the dumping operation.

10 Claims, 4 Drawing Figures

FILTER CARTRIDGE FOR SUMP CLEANER

TECHNICAL FIELD OF THE INVENTION

The present invention relates to tank style sump cleaners in general and, in particular, to filter cartridges for sump cleaners, or other filtering apparatus provided with a removable filter cartridge for the straining of solid particles from a suspension of liquid and solid materials.

BACKGROUND OF THE INVENTION

The prior art is generally cognizant of the general concept of including a filter in a tank type separator intended to separate out solid particles from a liquid and solid suspension. For example, U.S. Pat. No. 2,363,009 to Lewis discloses a fluid-separating filter element in a tank. Similarly, U.S. Pat. No. 3,355,026 discloses a portable filter including therein a removable filter element through which a liquid-solid suspension can be drawn. Other filter elements shown in combination with tanks through which fluid can be drawn can be found in U.S. Pat. Nos. 2,017,277, 2,172,031, 2,366,903, and 4,081,379.

SUMMARY OF THE INVENTION

The present invention is summarized in that in a sump cleaner having a tank, a vacuum pressure generator and a filter, a filter cartridge is provided which includes cartridge unit mounting means for mounting the filter cartridge on top of the tank of the sump cleaner; an elongated, rigid, perforated filter shell depending downwardly from the cartridge unit mounting means into the tank and having open top and bottom ends; a flexible, removable filter sleeve received inside of the filter shell to serve as the filter to separate solids from sump materials passing therethrough; a top cover to close the top of the filter shell; and an openable bottom door closing the bottom of the filter shell; the filter shell being tapered to increase in cross-sectional size toward its bottom end so that solids in the filter sleeve will fall out of the filter sleeve when the bottom door is opened without jamming and bridging across the filter shell.

It is an object of the present invention to provide a filter unit for a portable sump cleaner which is the form of a removable yet relatively large cartridge which can be removed from the sump cleaner and handled separately from it.

It is another object of the present invention to provide such a filter cartridge for a sump cleaner which can be easily and efficiently emptied from its bottom with the possibility of it becoming clogged by solidifying solids extracted from the sump being minimized.

It is yet another object of the present invention to provide such a filter cartridge which has structure particularly adapted so that it can be easily lifted by any of several mechanical hoisting apparatus commonly found in the types of facilities in which sump cleaners are commonly used.

Other objects, advantages, and features of the present invention will become apparent from the following specification when taken in conjunction with the accompanying drawings.

DESCRIPTION OF THE PREFERRED EMBODIMENT

Figure 1:
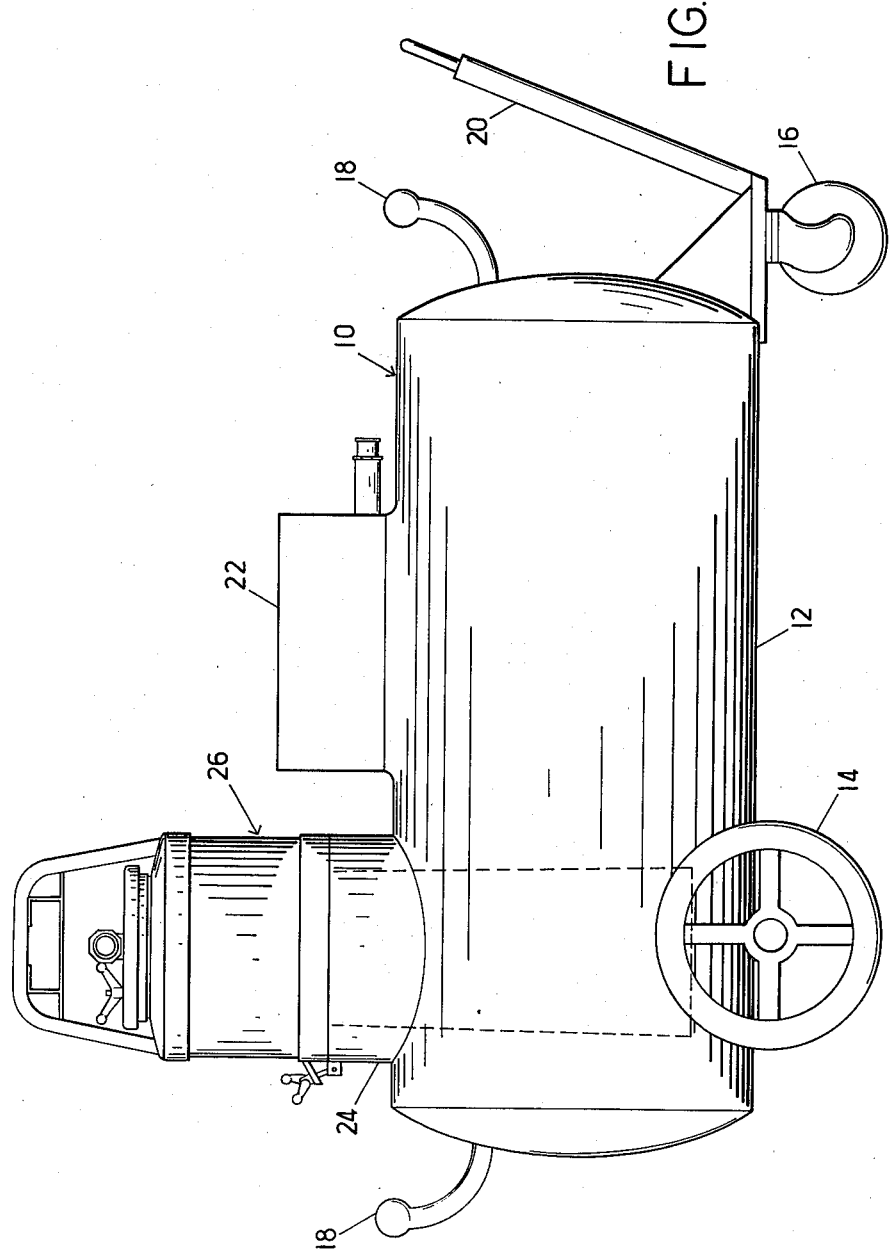
FIG. 1 is a side elevation view of a portable sump cleaner constructed in accordance with the present invention.

Shown in FIG. 1, and generally illustrated at 10, is a portable sump cleaner constructed in accordance with the present invention. The sump cleaner 10 includes a large tank 12 which forms the bulk of the volume of the sump cleaner 10. The tank 12 can be mounted on wheels, such as shown at 14 and 16, suitable for towing, or it also can be mounted on casters, or on a flat deck mounting to be handled by a forklift through the use of a pallet, or any similar mobile mounting. A pair of hand push bars 18 are located at opposite ends of the tank 12 so that the sump cleaner can be manually pushed into position as needed, while at the same time a tow bar 20 is provided so that the sump cleaner 10 can be easily towed by conventional tow trucks or tractors as may be normlly found in an industrial environment. It is to be understood that a wide variety of other mobile mounting structures can be utilized for the tank 12 and the sump cleaner 10 within the spirit of the present invention.

On top of the tank 12, a vacuum pressure generator 22 is provided. The vacuum pressure generator may be driven by air pressure or may be driven by electrical power. In its operation, the vacuum pressure generator 22 generates a strong vacuum inside of the tank 12 so as to draw fluid into the tank. Mounted on an upstanding boss 24 provided on the tank 12 is a removable filter cartridge unit generally indicated at 26 through which fluid is drawn into the tank 12. Details of the filter cartridge unit 26 can be viewed more easily in FIGS. 2 and 3.

Figure 2:
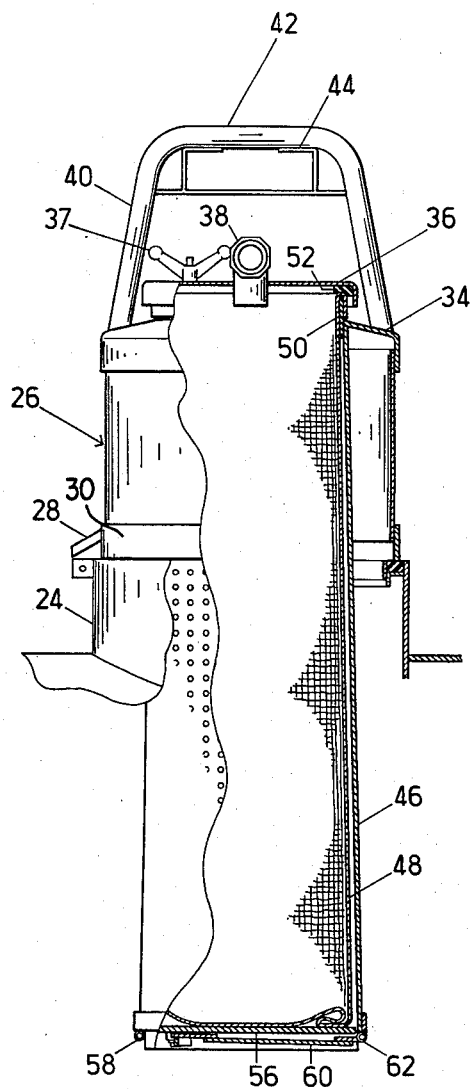
FIG. 2 is a front elevational view partially in cross-section of the filter cartridge unit of the sump cleaner of FIG. 1.

Referring to FIG. 2, the removable filter cartridge unit 26 sits atop the boss 24 on the tank 12 only a broken away part of which is shown in FIG. 2. Clamp fittings 28, formed of a pair of outwardly extending, spaced fingers, extend outwardly from an annular base collar 30 provided at the base of a cylindrical cartridge unit mount 32. The base collar 30 is designed to fit tightly against and seal to the top of the boss 24 provided on the tank 12. The cartridge unit mount 32 is a large cylindrical unit designed to hold the entire cartridge unit 26 in place on the tank 12. On the top of the cartridge unit mount 32 a cartridge unit cover 34 is provided covering the top of the cartridge unit mount 32. An access plate 36, which is circular and flat in its shape and which has a down-turned peripheral edge, is fastened to an opening formed in the top of the top cover 34 so as to entirely cover the top of that opening in a fluid-tight fashion. An intake suction port 38 is provided extending through the top of the access plate 36 and opening into the interior of the filter cartridge 26.

A lift fitting 40 is provided integrally attached to the top cover 34 of the cartridge unit mount 32, as by welding. At its center, the lift fitting 40 includes a hoist loop portion 42 which is located along the longitudinal center line of the filter cartridge 26 and which is designed and sized to be engaged by a hook on a conventional industrial hoist. The loop portion 42 and the entire lift"

fitting 40 are constructed of sufficiently durable and strong materials such that they are capable of supporting the entire weight of the filter cartridge unit 26 when the filter cartridge unit 26 is entirely filled with metallic scrap material. Underneath the loop portion 42, a forklift pocket 44 is provided securely welded to the interior of the lift fitting 40. The forklift pocket 44 is constructed to be of suitable size and shape so as to be adapted to receive therein at least one fork of a conventional industrial forklift truck.

Figure 3:
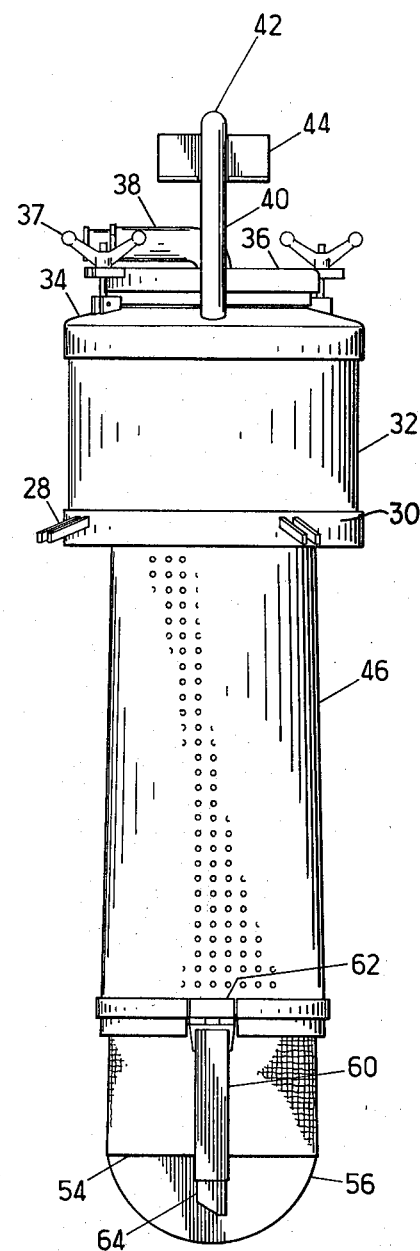
FIG. 3 is a side elevational view of the filter cartridge unit of FIG. 2 with the bottom door thereof shown open.
Figure 4:
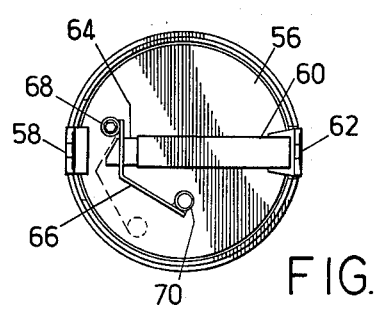
FIG. 4 is a bottom plan view of the filter cartridge unit of FIGS. 2 and 3.

Depending downward from the cartridge unit mount 32 into the interior of the tank 12 is a filter shell 46. The filter shell 46 is preferably formed of rolled, perforated steel or other sheet metal. While appearing to be generally cylindrical in shape, the filter shell 46 is actually frusto-conical in shape, being provided with a slight taper in its cross-sectional diameter so that its upper end is slightly smaller than its lower end. The filter shell 46 is positioned in a generally vertical orientation and at its upper end is centrally positioned inside of the cartridge unit mount 32 of the cartridge unit 26. The filter shell 46 extends downward from the mount 32 into the interior of the tank 12. Positioned inside of the filter shell 46 is a filter sleeve 48. The filter sleeve 48 is formed as an elongated, cylindrical sleeve of woven fabric with the material of the fabric of the filter sleeve 48 being selected to be extremely durable and relatively stiff and also to be relatively economical so that the filter sleeve 48 can be disposable, if so desired. The material of the filter sleeve 48 is formed with a wide, or open, weave so that fluid material may pass freely therethrough. At its upper end, the filter sleeve 48 may by provided with a collar 50 formed of durable yet more pliable material than the remainder of the filter sleeve 48, though the collar 50 may be omitted if the material used for the remainder of the filter sleeve is sufficiently pliable. The collar 50 is placed over the peripheral edge of the top of the filter shell 46 and secured in place by the access plate 36. A gasket 52, formed of resilient material in an annular shape, is placed on the interior of the access plate 36 and seals against the top of the filter shell 46 so as to hold the collar 50 firmly between the access plate 36 and the top of the filter shell 46. The bottom edge of the filter sleeve 48, indicated at 54 in FIG. 3, is rolled up and placed inside of a bottom door 56 provided to close the bottom of the filter shell 46. The bottom door 56 is a metallic plate of circular flat shape which is secured by a hinge 58 to one edge of the bottom of the filter shell 46. A bottom closure lever 60 is secured by a hinge 62 to the bottom edge of the filter shell 46 on the opposite side from the hinge 58. In the closed position of the bottom door 56, as can be seen in the bottom view of FIG. 4, the bottom closure lever 60 lies alongside the closed bottom door 56 and is held in its closed position against the bottom door 56 by a pivotable door latch 66. The door latch 66 is mounted by a bolt 68 constructed so that the door latch 66 is pivotable thereabout and the door latch 66 has a finger loop 70 provided at its opposite end so that it can be easily manually manipulated. The door latch 66 engages a latch tongue 64 pprovided at the end of the bottom closure lever 60 so as to restrain the bottom door lever 60 to keep the bottom door 56 closed as can be seen in FIG. 4. Shown in FIG. 4 in broken lines is the position of the door latch 66 when the bottom door 56 is being opened.

In its operation, the sump cleaner 10 of FIGS. 1 through 4 is intended to remove sump materials from milling machines or other metal machining apparatus, and to filter the sump materials so as to remove solids, including scraps, burrs, and shavings from the sump materials so that the clean sump materials can then be returned to the same machine or to other machines for reuse. The sump cleaner 10 of FIGS. 1 through 4 is designed to be portable so that it can be brought to the machine in which the sump materials are to be cleaned. A hose is connected from the sump of the machine whose sump is being cleaned connected to the intake suction port 38 which opens into the interior of the filter cartridge 26. Then power is supplied to the vacuum pressure unit 28 to create a vacuum inside of the tank 12 to draw fluid from the sump of the machine being cleaned through the intake suction port 38 into the interior of the filter cartridge 26. As material passes into the interior of the filter cartridge 26, fluid material can pass through the filter sleeve 48 and the filter shell 46 to the interior of the tank 12, and does so, while solid material of sufficient size to be engaged by the filter sleeve 48 is restrained within the filter cartridge 26. This operation is continued until the sump of the machine is cleaned at which time the apparatus may be moved to other machines until such time as it is desired or necessary to empty the filter cartridge.

The sump cleaner 10 of FIGS. 1 through 4 is particularly designed so that the emptying of the filter cartridge 26 of the sump cleaner 10 can be achieved with a maximum amount of speed and safety, and as easily as possible. The large size of the filter cartridge 26 insures that the sump cleaner 10 may be used to clean the sumps of a relatively large number of machines prior to such time as the filter cartridge 26 needs emptying. However, in view of the fact that the materials which are retained within the filter sleeve 46 are of a metallic character, the large volume of material contained within the filter cartridge 26 means that the filter cartridge 26 will be relatively heavy and can, in fact, weigh several hundred pounds. Therefore, the provision for the lift fitting 40 on top of the filter cartridge 26 is especially significant in allowing the filter cartridge 26 to be either lifted by the joist loop 42, or by the lift pocket 44, so that the filter cartridge 26 can be lifted entirely out of the sump cleaner 10. It is for this reason that the lift fitting 40 is integrally attached to the filter cartridge 26 in a secure fashion. By providing in the lift fitting 40 both a hoist loop 42, that can be used by a hook of a chain hoist or other light crane, and a lift pocket 44, suitable for engagement by the fork of a forklift truck, the maximum amount of flexibility in utilizing widely available industrial equipment for lifting the filter cartridge 26 is achieved. Using either the hoist loop or the lift truck, the filter cartridge 26 is lifted out of the sump cleaner 10 by the lift fitting 40 after which the filter cartridge 26 can be handled in one of two ways.

In one method, the filter cartridge 26 can be considered as a replaceable cartridge, and the plant in which the sump cleaner 10 is utilized can utilize more than one of the filter cartridges 26, and therefore a full filter cartridge 26 can be removed from the sump cleaner 10 and a second filter cartridge 26, which is then empty, can be inserted into the sump cleaner 10 so that the sump cleaner 10 can resume its cleaning operations. In this way, the filter cartridge 26 that was filled can be emptied at a later time or at a remote location while the sump cleaner 10 remains in constant operation in the plant.

Alternatively, the filter cartridge 26 can be dumped directly into a waste depot or a waste storage container after it is lifted from the sump cleaner 10. This is accomplished by maintaining the filter cartridge 26 on the hoist or on the forklift truck and positioning the filter cartridge 26 over the container into which the materials contained in the filter cartridge 26 is to be emptied. With the bottom of the filter shell 46 located over the container into which it is to be emptied, the pivotable door latch 66 can be operated by manually grasping the finger loop 70 and pulling thereon. This allows the bottom closure lever 60 to fall open thereby allowing the bottom door 56 to fall open into the position as indicated in FIG. 3. The mechanical advantage obtained by using the bottom closure lever 60 as a lever to hold the bottom door 56 closed insures that a large amount of physical strength is not required to open the door by pivoting the door latch 66 and, at the same time, insures that the bottom door is easy to close and securely held in place even when a large volume of material is retained within the filter cartridge 26. When the bottom door 56 pivots open, the bottom edge 54 of the filter sleeve 48 unrolls allowing the material contained therein to fall out of the bottom thereof.

It is at this point that the taper provided to the filter shell 46 is of critical importance. The metallic material commonly contained within the filter sleeve 46 will include large amounts of shavings, burrs, flakes, and other small fragments of metallic material, and these materials commonly tend to congeal together inside of a filter of the type contained within the filter cartridge 26. These congealed metallic materials can form a "bridge" extending across the entire interior of a filtering mechanism thereby preventing easy and efficient bottom unloading of such materials. However, the fact that the filter shell 46 is provided with a taper, that is that its diameter increases in size in a downward direction, helps to insure that this bridging effect does not occur since the slight taper causes any such "bridge" which is formed between the sides of the filter shell 46 to become convex in shape, thereby suffering a structural failure, and falling out of the bottom of the filter shell 46. At such time as the entire contents of the filter sleeve 48 have been emptied from the bottom thereof, the bottom 54 of the filter sleeve 48 can be rolled back up into the interior of the filter shell 46 and the bottom door 56 can be closed and latched through the use of the bottom closure lever 60 to firmly close the bottom of the filter cartridge 26 so that it can be restored to its position inside of the sump cleaner 10.

The structure of the filter cartridge 26 is also particularly advantageous in allowing easy manipulation and replacement of the filter sleeve 48. Since the filter sleeve 48 is an elongated piece of fabric open at both ends, it is relatively easy to install inside of the filter shell 46. With the bottom door 56 open, the access hatch 36 can be removed and the filter sleeve 48 can be draped inside of the filter shell 46. Then the collar 50 of the filter sleeve 48 is placed over the top peripheral edge of the filter shell 46 and the access plate 36 is restored in position and secured with the clamps 37. Then the bottom 54 of the filter sleeve 48 can be rolled back into the bottom of the filter shell 46 and the bottom door 56 closed so that the filter cartridge 26 is in a useable configuration wherein it can be restored to the sump cleaner 10.

The use of the filter cartridge 26 in conjunction with the sump cleaner 10 allows easy and convenient emptying of the filter cartridge when is is full of waste materials which have been filtered from sumps which have been cleaned by the sump cleaner 10. The provision for the lift fitting 40 allows the filter cartridge 26 to be easily lifted from place without the need for specialized slings or fittings which would make use of the filter cartridge 26 more inconvenient or dangerous. The provision for the forklift pocket 44 is particularly convenient since the forklift can easily come to the sump cleaner 10 and can also easily transport the filter cartridge 26 away from the sump cleaner 10, either to swap filter cartridges to bring back a new one, or to take the filter cartridge 26 to an emptying location for quick dumping. The provision for the taper in the filter shell 46 insures that bridging of the materials contained therein is minimized thereby avoiding the need for personnel to attempt to dig out such materials in a potentially dangerous procedure. The mounting of the filter sleeve 48 within the filter shell 46 is particularly convenient since there is no need for any particular slits or openings inside of the filter sleeve 48 and there is no need for any special bands or clamps to restrain the filter sleeve 48 in position other than the gasket 52 which would normally be required in any event to seal the vacuum inside of the filter cartridge 26. Furthermore, the construction of the bottom of the filter cartridge 26 insures safe operation during a dumping since the operator of the apparatus who opens the bottom door 56 does so by use of the pivotal latch 66 and since the hand operating that door latch 66 will at all times be shielded from the material within the filter sleeve 44 by the door 56, the hands of the operator are kept out of the way of any hazardous materials. In summary, an easy and convenient to use filter cartridge is described herein which makes operation of the sump cleaner 10 more efficient and the utilization and dumping of the filter cartridge 26 easier.

It is to be understood that the present invention is not limited to the particular arrangement and construction of parts illustrated and described herein, but embraces all such modified forms thereof as come within the scope of the following claims.

What is claimed is:

1. In a sump cleaner having a tank, a vacuum pressure generator and a filter, a filter cartridge comprising:
   cartridge unit mounting means (30, 32, 34) for mounting the filter cartridge on top of the tank of the sump cleaner;
   an elongated, rigid, perforated filter shell (46) depending downwardly from the cartridge unit mounting means (30, 32, 34) into the tank and having open top and bottom ends;
   a flexible, removable filter sleeve (48) received inside of the filter shell (46) to serve as the filter to separate solids from sump materials passing therethrough;
   a top cover (36) to close the top of the filter shell (46); and
   an openable bottom door (56) closing the bottom of the filter shell;
   the filter shell (46) being tapered to increase in cross-sectional size toward its bottom end so that solids in the filter sleeve (48) will fall out of the filter sleeve (48) when the bottom door (56) is opened without jamming and bridging across the filter shell (46).

2. In a sump cleaner, the filter cartridge as claimed in claim 1 wherein bottom door (56) is pivotally hinged to one side of the bottom of the filter shell (46).

3. In a sump cleaner, the filter cartridge as claimed in claim 2 wherein a bottom closure lever (60) which serves to keep the bottom door (56) closed is pivotally hinged to the side of the bottom of the filter shell (46) opposite from the hinge joining the bottom door (56) to the filter shell (46).

4. In a sump cleaner, the filter cartridge as claimed in claim 3 wherein a pivotable door latch (66) is mounted on the bottom door (56) to restrain the bottom closure lever (60) to hold the bottom door (56) closed.

5. In a sump cleaner, the filter cartridge as claimed in claim 1 wherein the filter sleeve (48) is held in place in the filter shell (46) by its top end which is held between the top cover (36) and the top of the filter shell (46).

6. In a sump cleaner having a tank (10), a vacuum pressure generator (22), and a filter (48), a filter cartridge (26) comprising:
  cartridge unit mounting means (30, 32, 34) for mounting the filter cartridge (26) on top of the tank (10) of the sump cleaner;
  an elongated, rigid, perforated filter shell (46) depending downwardly from the cartridge unit mounting means into the tank and having open top and bottom ends;
  a top cover (36) closing the top of the filter shell (46);
  an openable bottom door (56) closing the bottom end of the filter shell (46);
  a flexible, removable filter sleeve (48) received inside the filter shell (46) to serve as a filter to separate solids from sump materials passing therethrough; and
  a lifting fitting (40) mounted on the top of the cartridge unit mounting means so that the entire filter cartridge (26) can be lifted out of the sump cleaner so that the contents of the filter sleeve (48) can be easily emptied by opening the bottom door (56) to allow the contents of the filter sleeve (48) to fall out thereof, the filter shell (46) being tapered in size increasing toward its bottom end to facilitate material falling out of the filter sleeve (48) without jamming or bridging.

7. In a sump cleaner, the filter cartridge as claimed in claim 6 wherein the lifting fitting (40) includes both a hoist loop (42) adapted to being lifted by a hoist crane and a lift pocket (44) adapted to being lifted by one fork of a fork lift truck.

8. In a sump cleaner, the filter cartridge as claimed in claim 6 wherein the bottom door (56) is hinged on one side to the bottom of the filter shell (46) and wherein a bottom closure lever (60) is hinged to the other side of the bottom of the filter shell (46) to hold the bottom door (56) in a closed position.

9. In a sump cleaner, the filter cartridge as claimed in claim 8 wherein a pivotable door latch (66) is mounted on the bottom door (56) to hold the bottom closure lever (60) in place when the bottom door (56) is to remain closed.

10. In a sump cleaner, the filter cartridge as claimed in claim 6 wherein the filter sleeve (48) is larger than the filter shell (46) with the excess portion of the filter sleeve (48) being adapted to being rolled up to sit inside of the bottom door (56) when it is closed so that the bottom of the filter sleeve (48) will easily unroll and empty when the bottom door (56) is opened.

* * * * *